United States Patent [19]

Hirth

[11] 4,151,648

[45] May 1, 1979

[54] DENTAL APPARATUS WITH INSTRUMENT HOLDER

[75] Inventor: Emil Hirth, Malsch, Fed. Rep. of Germany

[73] Assignee: Sybron Corporation, Rochester, N.Y.

[21] Appl. No.: 842,544

[22] Filed: Oct. 17, 1977

[30] Foreign Application Priority Data

Oct. 28, 1976 [DE] Fed. Rep. of Germany ....... 2649055

[51] Int. Cl.2 .......................... 137 355.19; A61C 19/02

[52] U.S. Cl. ...................... 32/22; 242/107; 137/355.19

[58] Field of Search ............................ 32/22; 242/107; 137/355.16, 355.18, 355.19, 355.2, 355.21, 355.22, 355.23

[56] References Cited

U.S. PATENT DOCUMENTS

| | | | |
|---|---|---|---|
| 840,200 | 1/1907 | Craft | 32/22 |
| 1,102,164 | 6/1914 | Parker | 32/22 |
| 1,491,739 | 4/1924 | Russell | 32/22 |
| 1,649,251 | 11/1927 | Pieper | 32/22 |
| 2,261,325 | 11/1941 | Angell | 32/22 |
| 3,705,962 | 12/1972 | Banister | 242/107 |

*Primary Examiner*—Louis G. Mancene
*Assistant Examiner*—John J. Wilson
*Attorney, Agent, or Firm*—Theodore B. Roessel; J. Stephen Yeo

[57] ABSTRACT

A dental apparatus retracts supply hoses connected to associated dental instruments. A coil spring is used within a housing. The hose is interposed between the windings of the spring. When the hose is extended, the radius of the coil contracts causing control switches to be activated. A ratchet engages dogs on the spring preventing unwanted retraction. Upon release of the ratchet, the coil spring expands drawing the hose into the housing.

6 Claims, 5 Drawing Figures

DENTAL APPARATUS WITH INSTRUMENT HOLDER

BACKGROUND OF THE INVENTION

The invention concerns a dental apparatus and more particularly concerns dental apparatus with an instrument holder having retractable hoses.

Apparatuses of this type are used for the performance of surgical and conservation treatment in dentistry. To this end, hand instruments must be supplied with operating materials such as water, air and electrical current by means of hoses and cables. The hoses used should therefore have a length which permits the removal of the instrument from its repository and its leading up to or into the mouth of the patient. On protective and hygienic grounds it is desirable to retract the hoses into the apparatus.

Various apparatuses of this type are known. One example is disclosed in German DP No. 836,833. In this, hose drums with expensive fittings are used while allowing the drum to turn to introduce the operating material into the hose. Spring loaded metal rings may be used to provide a seal against an escape of flow materials.

Another apparatus according to German DP No. 623,743 makes use of a flat spring in order to provide one or several round discs, with a moment of rotation in the direction of the coil winding of the hose. The discs are mounted so as to be turnable on an axis positioned in the middle section of the "housing". The end of the supply line which carries the tool, fits on the edge of the disc; the remaining supply line runs on the inner surface of the disc in the form of a flat spiral. This construction requires bearing material and an extra long hose for the disc, since the retractable end of the hose is wound on the outer edge and an additional hose section is found in the inner part of the disc which must have a sufficient length for the changing of its radius with the turning of the disc. In addition to one disc for each instrument, for each instrument a corresponding housing is also required. The disadvantage of this construction is to be seen in the expenditure of material and production costs.

An object of the invention is the task of avoiding in an instrument holder disadvantages of the expensive parts, such as a bearing journal for revolving discs in the form of spool drums, and feeder hoses with their problematic supplying of operating material with the operating material hoses, which often have a total length the multiple of their extension length.

Another object is to supply an advantageous control of the feed of the operating material for each individual instrument with consideration for a corresponding housing construction.

SUMMARY OF THE INVENTION

An instrument holder has retractable operating material hoses which are used to carry material to associated instruments. Housings are provided with a hole in the center for supplying of the operating material. On the side of the hole a coil spring is suspended.

A spring-loaded push rod, controlled by the inner radius of the coil spring, serves for the operation of the through valves for the operating material. For the release of tension of the operating material hoses during the removal of the instruments, stop dogs are attached on the coil spring, which are provided for some predetermined extension lengths in corresponding positions and engage behind a ratchet. The flat housings of the instrument holder may be stacked in which case they are aligned by means of one or more instrument mounting supports and held together with fixing screws. The uppermost housing is provided with a cover which can be used as a repository, while the lowermost flat housing has a form which makes possible a shielded feeding of the operating material from the instrument holder attachment to the middle opening the permits the fastening of the housing on a supporting arm, so that this latter serves as carrier of the whole instrument holder.

Some of the advantages of this approach are that by means of a simple construction, low-cost parts can find use and by means of the elimination of bearings and movable parts the incidence of trouble is reduced.

BRIEF DESCRIPTION OF THE DRAWINGS

A form of construction is presented in the drawing and described as follows.

DESCRIPTION OF THE INVENTION

Figures 1, 2:
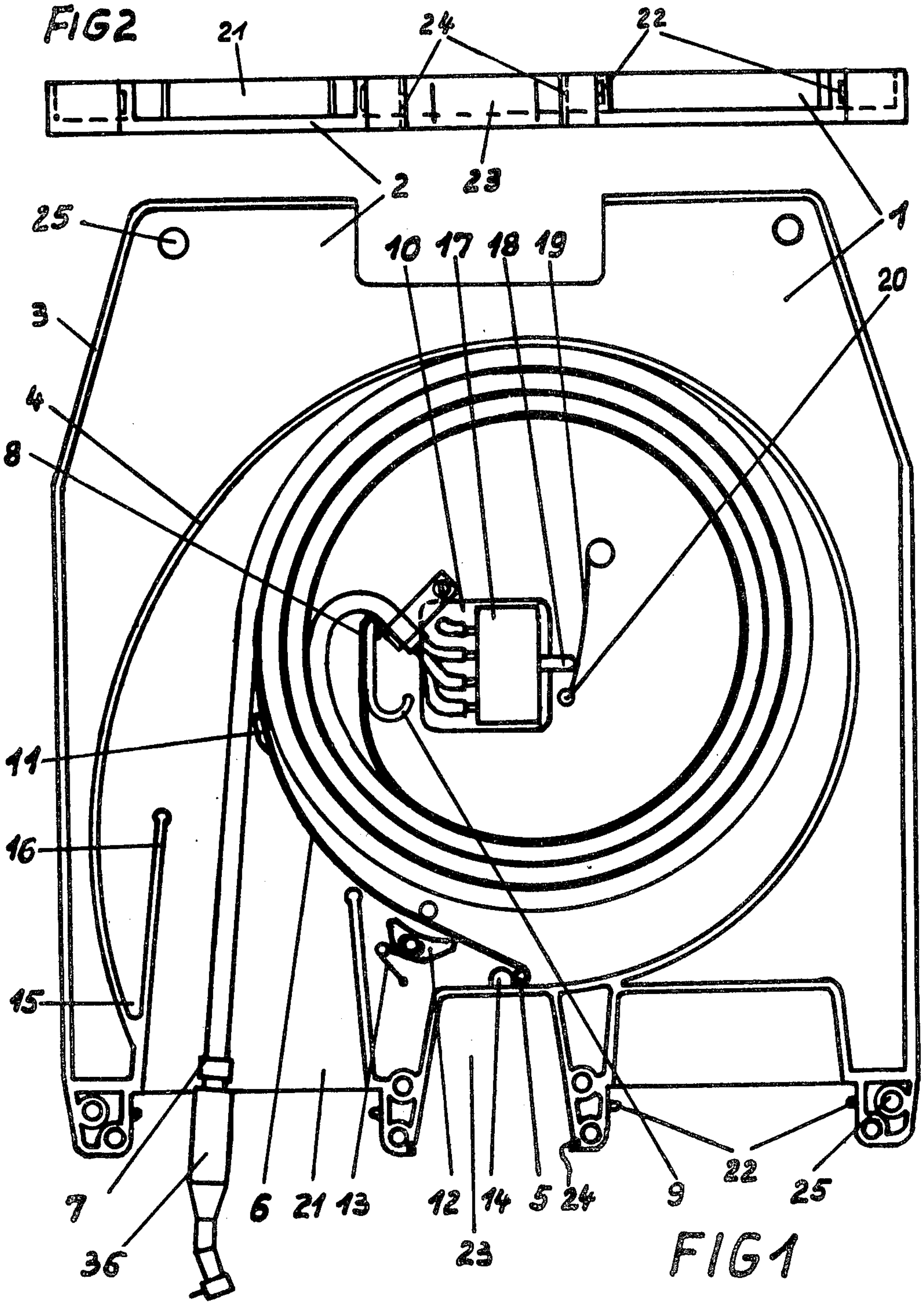
FIG. 1 represents in a top view one of the housings with a retracted hose.
FIG. 2 shows the front view of the housing represented in FIG. 1.

In FIG. 1, a flat housings 1, is shown. Base 2 has a somewhat rectangular form. Two vertical walls 3, 4 have height which amounts to at least the single diameter and at most, less than double the hose diameter of an enclosed instrument hose 7. The outer of the vertical walls 3 forms the side closure, while the inner of the vertical walls 4 serves in the withdrawal of the hose 7 and the guiding of the end 5 of a flat coil spring 6, which is positioned between the coils of the enclosed hose 7. Spring 6 has a fixed end 8 on a projection 9, which is suspended on the base 2 of the housing 1 at the side of the opening 10. On the flat coil spring 6, one or several dogs 11 are arranged at intervals. During withdrawal of hose 7, the dogs can engage behind the ratchet 12 which is loaded by a spring 13, thereby providing traction relief. The retracted instrument position is established by the striking of the end 5 of the flat coil spring on a stop 14, while the extended hose position is limited by means of the butting of the end 5 in a pocket 15 which is formed by the inner wall 4 and a hose guiding wall 16. Control valves 17 are mounted in hole 10, which is found approximately in the middle of the base 2 of the housing. The control valves' dimensions are limited in such a way that they do not project in the mounted position between the lower edge of the base 2 and a plane over the vertical walls, 3, 4. The operation of the valves occurs through a spring-loaded push rod 18 which is connected (actuated) by means of an operating arm 19 which is fixed on the base 2 at a point 20. In the pulling-out of the hose 7, the inner diameter of the flat coil spring is reduced 6, and thereby moves the operating arm 19 in the direction of the connection. The feed of the operating material, (i.e. water, air and current) occurs also through the hole 10. On the front side of the flat housing 1, one or more openings 21 are made on whose front side are provided aligning springs 22 which fill the purpose of aligning layered housings by insertion of the grooves of instrument mounting supports as will be shown in FIG. 5. A central indentation 23 on the front side which has on its front end a groove 24 can serve for the reception of a film viewer 35. Several borings 25 serve for the reception of fixing screws in the packaging.

Figure 3:
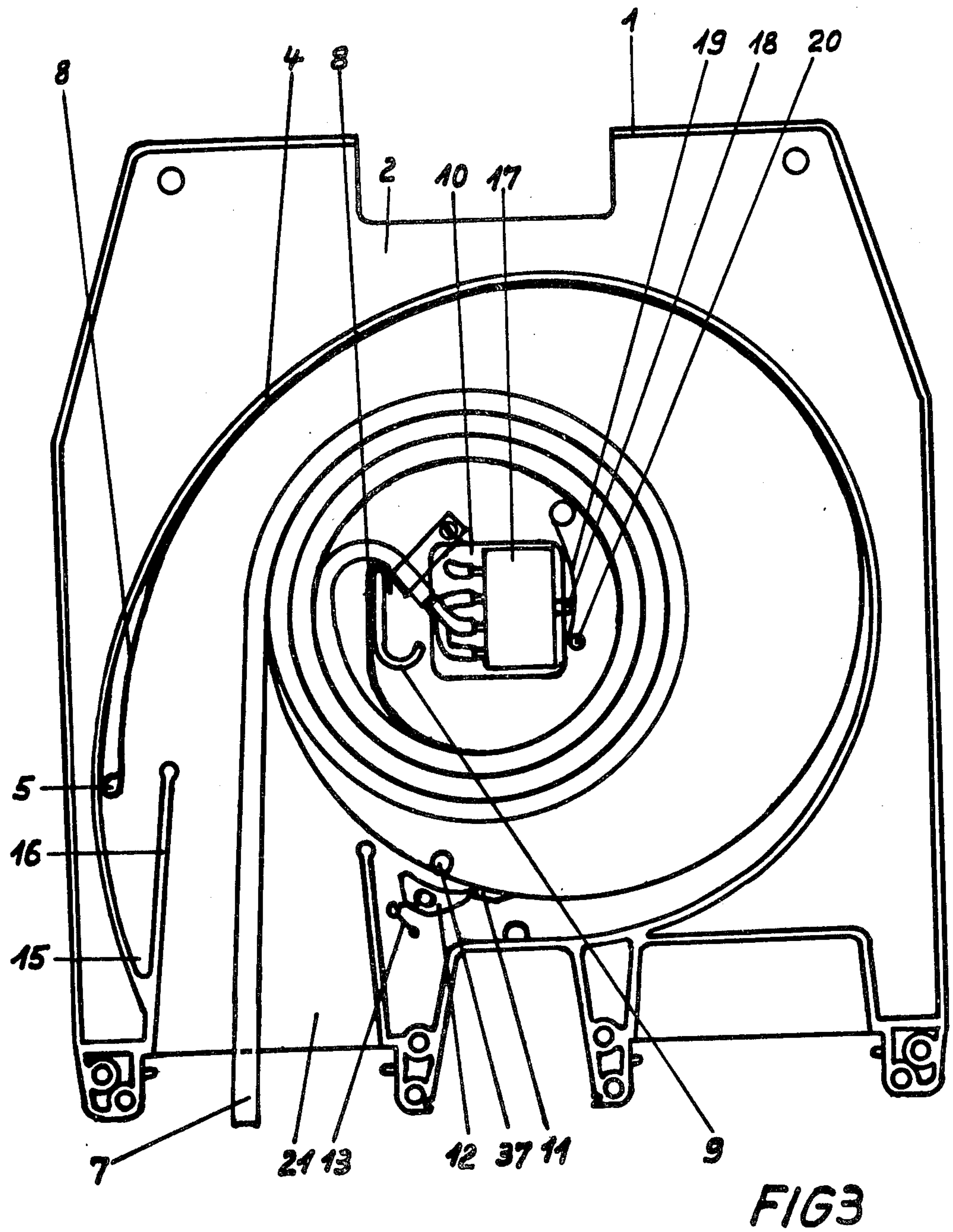
FIG. 3 in a top view shows the housing according to FIG. 1 with the hose drawn out and traction relieved and control valves operated.

In FIG. 3, housing 1 is to be seen with extended hose 7. Because the hose has been pulled out, the inner coil diameter of the coil spring 6 has been reduced and the end 5 has shifted in the direction of the pocket 15. Thereby, the dog 11 has moved in front of the ratchet 12. This action results a bracing of the coil spring 6 by means of a support 37 which is approximately opposite the bearing bolt of the ratchet 12. Moreover, an activation of the control valves results from the fact that the spring arm 19 mounted in the point 20 of the base plate 2 of the housing 1 shoves home the spring-loaded push rod 18.

Figure 4:
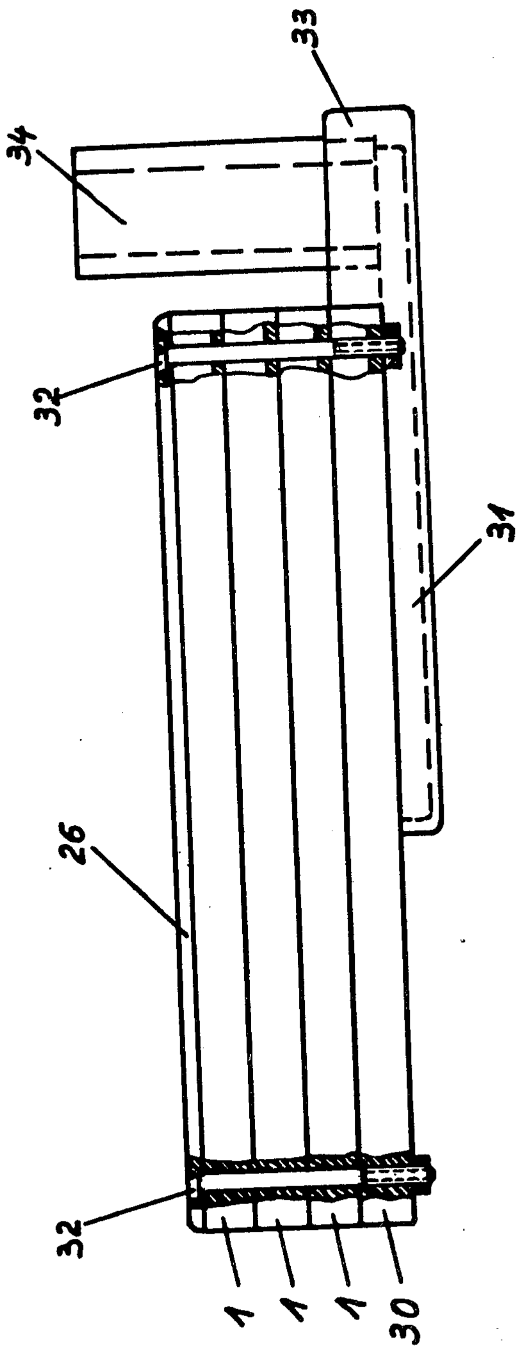
FIG. 4 shows in a side view several flat housings packaged in layers with a cover plate and a lower, differently formed housing for the reception of the operating material supply and a pivot pin for a connection with the support arm.

FIG. 4 shows the side view of an instrument carrier having four layered housings. The housings 1 and the lower housing 30 are held together by means of four screws 32, as can be seen in two opened sections. The lower housing has on its rear end 33 a hollow pin (pivot) 34, which is connected with the cable channel 31 and serves for fastening on a support arm.

Figure 5:
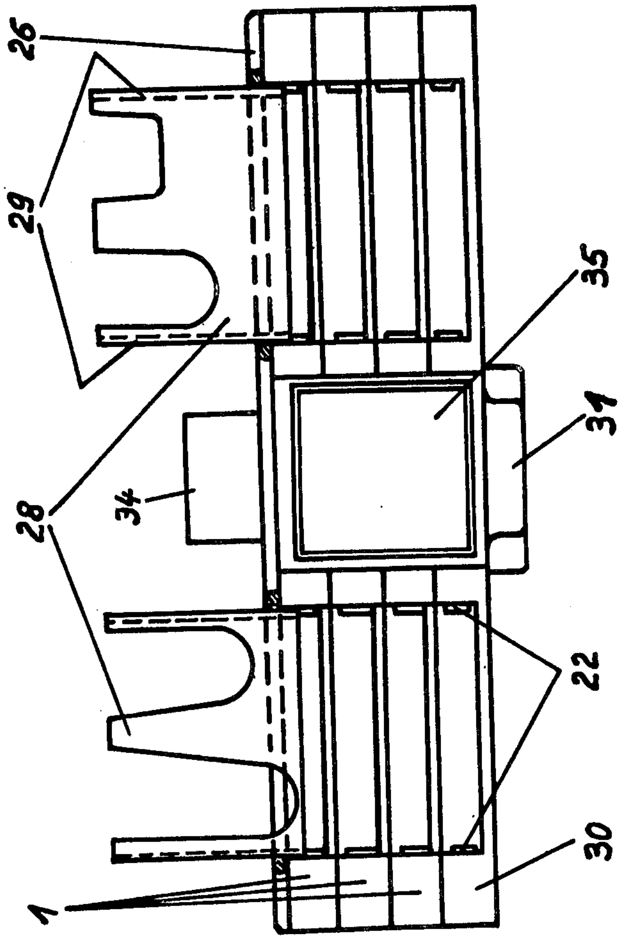
FIG. 5 shows the front view of the instrument holder package with the instrument mounting supports for the alignment of the package.

In FIG. 5 there is shown the front view of an instrument carrier with four housings 1 layered one upon the other. The uppermost housing is closed off by means of the cover 26 and thereby cut away in two places on its front edge to show instrument mounting supports 28 in extended position. Aligning springs 22 enter grooves 29 and thereby align the housings 1. The lower housing 30 has on its underside a molded channel 31 for the hoses and cables for operating material supply.

We claim:

1. Dental apparatus having at least one dental instrument holder for dental instruments connected to supply hoses, each holder comprised of:

a housing having a base plate, a vertical outer wall, and a vertical inner wall;

a supply hose having a diameter and wound in a coil, the inner end of the hose being fixed to the base plate;

said vertical walls having a height more than the hose diameter and less than twice the hose diameter;

said outer wall having an opening allowing passage of the free end of said hose;

said inner wall having a spiraling surface; and a coil spring installed between the windings of the hose coil and having one end fixed to the base plate and the other end free to move upon the spiraling surface of the inner wall, said coil spring providing tension for retracting said hose.

2. The apparatus of claim 1 which further includes:

at least one dog stop provided on the free end of said coil spring; and a ratchet mounted on said housing so as to engage said dog stop thereby relieving the hose from the tension of said coil spring allowing the hose to remain in an extended position.

3. The apparatus of claim 1, wherein the base plate has a hole approximately centrally located with respect to said hose coil and spring coil, said hole for the lead-in of operating material to the supply hoses.

4. The apparatus of claim 3 which further includes control means for controlling the input of operating material to the supply hose; and said coil spring having a inner coil diameter which decreases when the supply hose is extended actuating said control means.

5. The apparatus set forth in claim 1 having a plurality of layered dental instrument holders and including:

a plurality of layered housings;

members extending from said outer walls of the housings;

mounting supports having grooves, said grooves engaging said members thereby aligning said housings;

a cover plate for the top housing; and screws extending through vertical holes provided in said cover plate and housings for securing said cover plate and housings together.

6. Apparatus as set forth in claim 5 which includes:

a pivot pin connected to the base plate of the lowermost housing;

a channel extending through said pin to the centrally located hole in said base plate.

* * * * *